(12) United States Patent
Lardy

(10) Patent No.: US 10,597,045 B2
(45) Date of Patent: Mar. 24, 2020

(54) INFORMATION DISPLAY STRUCTURE, AND VEHICLE STATION AND BARRIER EQUIPPED WITH SAID STRUCTURE

(71) Applicant: Faiveley Transport Tours, Saint-Pierre-des-Corps (FR)

(72) Inventor: Gilles Lardy, Hong Kong (CN)

(73) Assignee: FAIVELEY TRANSPORT TOURS, Saint-Pierre-des-Corps (FR)

( * ) Notice: Subject to any disclaimer, the term of this patent is extended or adjusted under 35 U.S.C. 154(b) by 304 days.

(21) Appl. No.: 14/443,530

(22) PCT Filed: Dec. 9, 2013

(86) PCT No.: PCT/EP2013/075891
§ 371 (c)(1),
(2) Date: May 18, 2015

(87) PCT Pub. No.: WO2014/095443
PCT Pub. Date: Jun. 26, 2014

(65) Prior Publication Data
US 2016/0318525 A1    Nov. 3, 2016

(30) Foreign Application Priority Data

Dec. 17, 2012   (FR) ...................................... 12 62176

(51) Int. Cl.
*B61B 1/02*    (2006.01)
*E04B 2/72*    (2006.01)
(Continued)

(52) U.S. Cl.
CPC .................. *B61B 1/02* (2013.01); *E04B 2/72* (2013.01); *E05F 15/00* (2013.01); *E06B 3/4636* (2013.01);
(Continued)

(58) Field of Classification Search
CPC ...... G09F 15/00; G09F 15/0012; G09F 19/22; G09F 2019/221; G09F 9/00; B61B 1/02; E05F 15/00; E06B 3/4636; E04B 2/72
See application file for complete search history.

(56) References Cited

U.S. PATENT DOCUMENTS

| 5,729,289 A * | 3/1998 | Etoh .................. H04N 1/00384 348/333.02 |
| 2004/0103570 A1* | 6/2004 | Ruttenberg ............. G09F 23/06 40/584 |

(Continued)

FOREIGN PATENT DOCUMENTS

| DE | 10332012 | 12/2004 |
| EP | 2117901 | 11/2009 |

(Continued)

OTHER PUBLICATIONS

PCT/EP2013/075891 International Search Report dated Jan. 21, 2014 (6 pages including English translation.

*Primary Examiner* — Scott A Browne
(74) *Attorney, Agent, or Firm* — Brinks Gilson & Lione; John C. Freeman

(57) ABSTRACT

An information display structure includes a stationary part to be secured upright on or against a support; securing means for securing the stationary part; and at least one information display screen connected to the stationary part, extending in front of same, and having a visible front display face.

16 Claims, 7 Drawing Sheets

(51) Int. Cl.
*E05F 15/00* (2015.01)
*E06B 3/46* (2006.01)
*G09F 9/00* (2006.01)

(52) U.S. Cl.
CPC .......... *G09F 9/00* (2013.01); *E05Y 2900/404* (2013.01); *Y02T 30/30* (2013.01)

(56) References Cited

U.S. PATENT DOCUMENTS

| | | | | |
|---|---|---|---|---|
| 2008/0190031 | A1* | 8/2008 | Winkelmann | B61B 1/02 49/427 |
| 2011/0058326 | A1* | 3/2011 | Idems | G09F 9/30 361/679.21 |
| 2011/0116231 | A1 | 5/2011 | Dunn et al. | |
| 2011/0134356 | A1* | 6/2011 | Swatt | G09F 7/18 349/58 |
| 2012/0120234 | A1* | 5/2012 | Fullalove | B61B 1/02 348/143 |
| 2013/0270975 | A1 | 10/2013 | Dunn et al. | |

FOREIGN PATENT DOCUMENTS

| | | |
|---|---|---|
| JP | H 05266396 | 10/1993 |
| JP | 2001233201 | 8/2001 |
| JP | 2010008528 | 1/2010 |
| KR | 20010083025 | 8/2001 |
| KR | 100867153 B1 * | 11/2008 |
| KR | 20080097048 | 11/2008 |
| KR | 20110000114 U | 1/2011 |
| WO | WO 2006/131018 | 12/2006 |
| WO | WO 2011/059793 | 5/2011 |

* cited by examiner

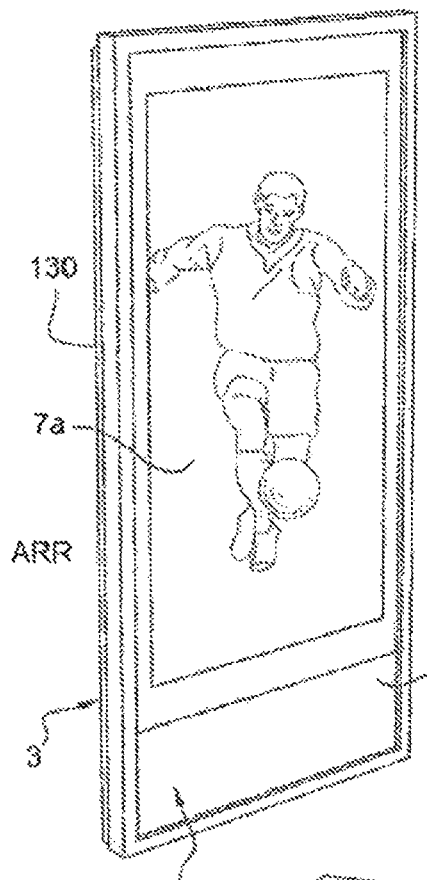
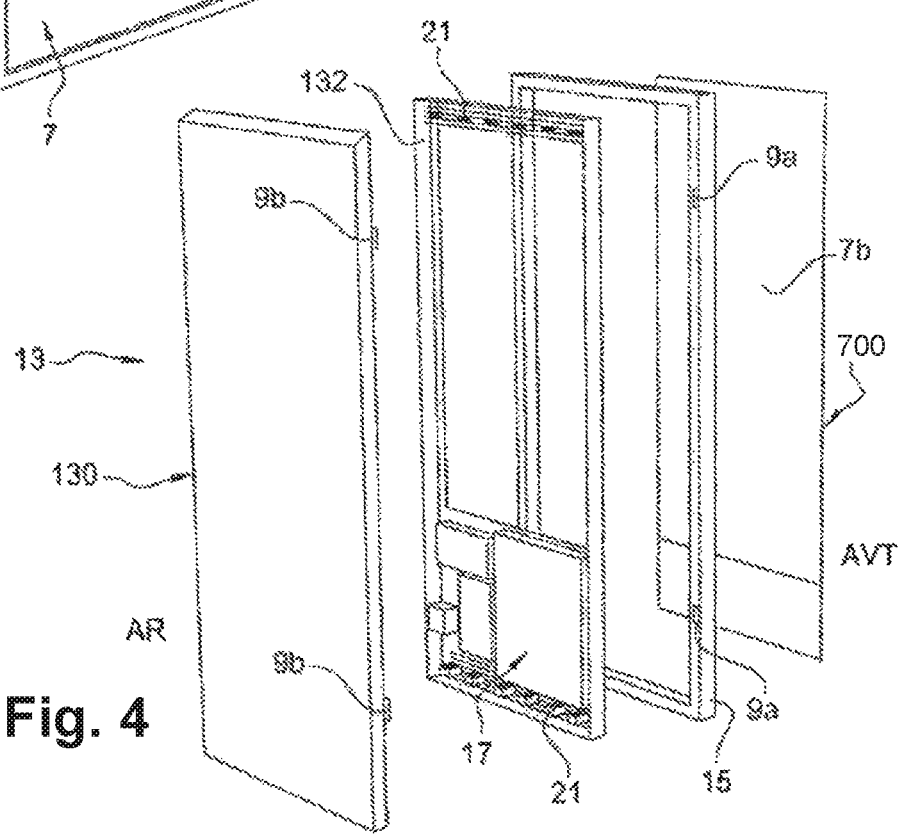

INFORMATION DISPLAY STRUCTURE, AND VEHICLE STATION AND BARRIER EQUIPPED WITH SAID STRUCTURE

This application claims priority to International Application No. PCT/EP2013/075891 filed Dec. 9, 2013 and to French Application No. 1262176 filed Dec. 17, 2012; the entire contents of each are incorporated herein by reference.

The present invention concerns:
firstly, an information display structure including:
  a stationary part to be secured upright on or against a support,
  securing means for securing the stationary part, and
  at least one information display screen connected to the stationary part and extending locally in front of same, the screen having a visible front display face,
secondly, an elongate barrier erected on the support which is horizontal, such as a station platform where a transport vehicle passes (in particular a train for transporting passengers), the barrier standing between an accessible front side and an inaccessible rear side and including, along its length, in particular several information display structures of the above type,
and also a station through which the transport vehicle passes, the station having a platform and providing accesses to the platform for passengers wishing to access the vehicle in the station, each access extending along an axis, the station including, along the platform, several information display structures.

It will have been understood that the information display structure cited in the first instance is a structure of the general type that is seen in train stations, metro stations and airports for displaying advertisements on their display boards of 40 inches and more (42 inches, 70 inches, etc.).

A problem is linked to the maintenance and siting of these structures.

A proposed solution is that mobility means are disposed between the stationary part and the display screen, or a facade provided in front of the display screen, in order to permit a movement of the display screen or of the facade with respect to the stationary part between:
  a closed position of the display screen or of the facade, with same positioned in front of or against said stationary part, this closed position being the operational position in which the screen of the from display face is visible from in front of the structure,
  and an opened position of the display screen or of the facade, allowing access for maintenance:
    behind the facade or the display screen,
    or to a rear face of the facade or of the screen.

A latch or a lock will advantageously secure the closed position.

In particular, if the aforementioned display structure is to be integrated in a barrier for protection/exclusion, which is solid except at the site of one or more movable doors, such as a platform barrier in a metro station or train station (then often called a barrier with entrance doors) or for example a barrier in an airport hall separating the public area from a flight arrivals area, it may be advantageous for the barrier effect to be permanently effective.

It is then recommended that the stationary part of the display structure includes:
  a stationary framework to be secured to the support by at least some of the securing means, and
  a solid or substantially solid block fixed to the stationary framework by second securing means and closing the rear of the screen or of the display structure, in the closed position.

To facilitate production, assembly and maintenance, it is further recommended that all or some of the following are provided:
  the solid block and the stationary framework together include, a priori along the barrier, a solid or substantially solid panel and a frame which at least partially surrounds it, the mobility means being disposed between the frame and the display screen or the facade,
  the display structure includes a movable peripheral structure to which is fixed the display screen and which preferably carries some of the mobility means,
  the mobility means includes hinges disposed vertically, locally along the stationary part and one of the lateral sides of the facade or of the movable peripheral structure,
  the display structure includes electrical or electronic components for operating the display screen, at least some of which components, with the display screen, are connected to said movable peripheral structure so as to be movable with the latter,
  the display structure includes a front pane which is situated in front of the display screen or of the facade and which is connected to one or the other, the front pane being mounted so as to be movable with the display screen or the facade.

In an alternative to the above, it is also proposed that the display structure:
  includes electrical or electronic components for operating the display screen, which components are fixed to the stationary part,
  and that the display screen is a touchscreen in front of which a facade pane is movable with respect to the stationary part, preferably without another pane in front of the screen.

Thus, the opening of the pane will give access to the components, or at least to some of them that will not have been organized so that they move with the movable (a priori glazed) facade.

Now as regards the abovementioned elongate barrier which is equipped with several information display structures, it is recommended that it includes, along its length:
  at least one movable door leaf in order to open and close a passage, at this location, between the accessible front and inaccessible rear sides,
  at least one stationary block to which the movable door leaf is connected mechanically and in parallel with which the leaf slides, the stationary block, which is adjacent to the leaf, enclosing a space in which is disposed at least one of the following components: a motor for motorizing the movable door leaf, a leaf drive device positioned functionally between the motor and the leaf, a device for locking or unlocking the leaf in an opened or closed position, and an end-of-travel abutment for the sliding of the movable door leaf,
  a stationary structural framework to which belongs the or each stationary block and which is fixed to each stationary part by the securing means for securing the stationary part, and
  means for securing the structural framework, which are fixed in the support, the information display structures for their part being situated at a distance from the or each leaf, and their front display faces preferably being visible on the accessible front side.

Each stationary block will be able to be replaced by or be integrated with a safety door equipped with an anti-panic bar system and mounted movably on a stationary surround, the safety door laterally bordering the movable door leaf, which will then slide parallel to it. The stationary surround will then belong to the structural framework.

To combine safety, practical maintenance and information, it has been envisioned that the anti-panic bar system is functionally connected to releasable securing means between the structural framework and the stationary part, which will then be defined by the safety door, such that this safety door can open, when a push is exerted on the anti-panic bar, even in the locked position of the locking means provided for selectively locking and unlocking the releasable securing means. Provision is further made that at least one of the information display structures is fixed to at least one of the safety doors.

On these barriers, the stationary structural framework will very advantageously be provided with (fixed) transparent panes at a distance from the zones where the display structures will be mounted.

Thus, especially in this case:
the display zones will not interfere with the zones of transit of the persons passing by the door leaves, and, on the platform or for example the hall where the barrier is erected, the persons present will be able to have easy and safe access to said displayed information on the display structures, without losing sight of their environment: arrival of a train at the station or of a person in the arrivals hall of the airport, etc.

It is further recommended that, along its length, the structural framework of the barrier includes upright lateral posts, between two of which is disposed at least one display structure, a display screen, or this display screen and the facade, preferably with transparent panes between other pairs of lateral posts, on each side of a display structure.

It is also recommended, for safety reasons, that the information display facade includes, in front of the display screen, at least one glazed panel through which the information will be seen.

It is also recommended that, along the barrier erected on the support, electricity supply cables are provided which are connected to the display screens and/or to at least one of said components, the cables passing through the support, at a distance from each leaf and stationary block or safety door (or, in this latter case, through the hollow post of the frame where the pivot shaft passes, since this is a zone that reams stationary when the door pivots).

The electrical connections will thus be facilitated, by making the installations easier without the need for a centralized connection on the barrier.

It is also recommended that, for safety reasons and for good management of the flow of persons in the area around the barriers:
the or each stationary block has, along the barrier, a free surface which is adjacent to the space for housing the components and which could be glazed and transparent, and the front display face of at least some of the information display screens is larger than the free surface, such that the display screens are sited at a distance from the stationary blocks and/or:
each barrier occupies the entire length of a station platform where a transport vehicle passes, and it includes:
two first sets of first and second stationary blocks extending along the barrier, and
two second sets of first and second movable door leaves,
with the display screens distributed:
on the one hand, in screen groups disposed side by side, toward the central part of the length of the platform, between the two second sets of first and second movable door leaves,
on the other hand, disposed individually, more laterally along the platform.

At least in this case, it is also recommended that the screen group disposed side by side toward the central part of the length of the platform has, along the length of the barrier, a length greater than the length of each second set.

To limit the costs without adversely affecting safety and to simplify maintenance, it is further recommended that, in front of each display screen, the display structure includes, along the barrier, a single pane in the direction of its thickness.

As regards now the station through which transport vehicles pass and which has a platform and provides accesses to the platform for passengers wishing to access the vehicle in the station, each access extending along an axis, the following is recommended as installation:
the station will include, along the platform, several information display structures of the above type or a barrier, the display screens being distributed:
on the one hand, in screen groups disposed side by side, toward the central part of the length of the platform, between the two groups of movable leaves and stationary blocks,
on the other hand, disposed individually, more laterally along the platform, the screen groups disposed side by side being offset laterally with respect to the axis of each access.

Here too, safety and good management of the flow of persons in the area of the barriers will thus be promoted.

According to another aspect, it further recommended that in the station the display screens can preferably be distributed:
on the one hand, in screen groups disposed side by side, toward the central part of the length of the platform, between the two groups of movable leaves,
on the other hand, disposed individually, more laterally along the platform than the first ones, at least some of the display structures of these second display screens being additionally provided with interactive operating means connected to remotely situated processing means for permitting man-machine interaction which allows a user situated in front of one of these second screens to transmit a request to the processing means, via the interactive operating means, and to obtain a return of information on the second display screens.

Other features and advantages of the invention will become clearer if necessary from the following description which is given solely as a non-limiting example and in which reference is made to the attached drawings, in which:

FIG. 3 and 4 show such a display structure when closed and in an exploded view, respectively;

Figure 1:
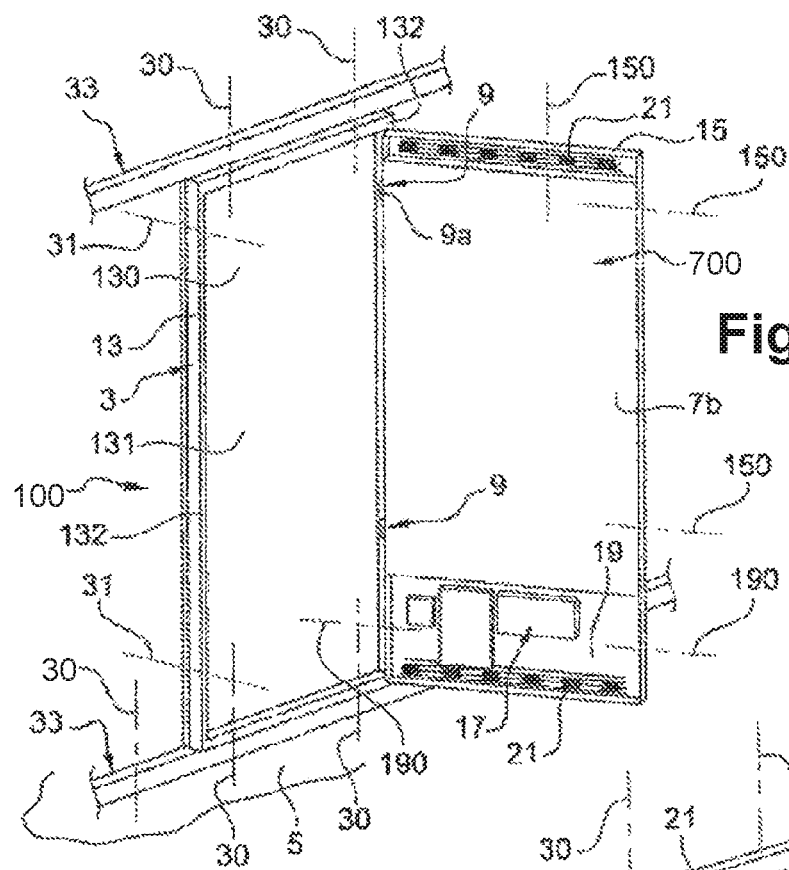
FIG. 1 and 2 are perspective views of an inventive display structure in a first embodiment and a second embodiment, respectively, when opened.
Figure 2:
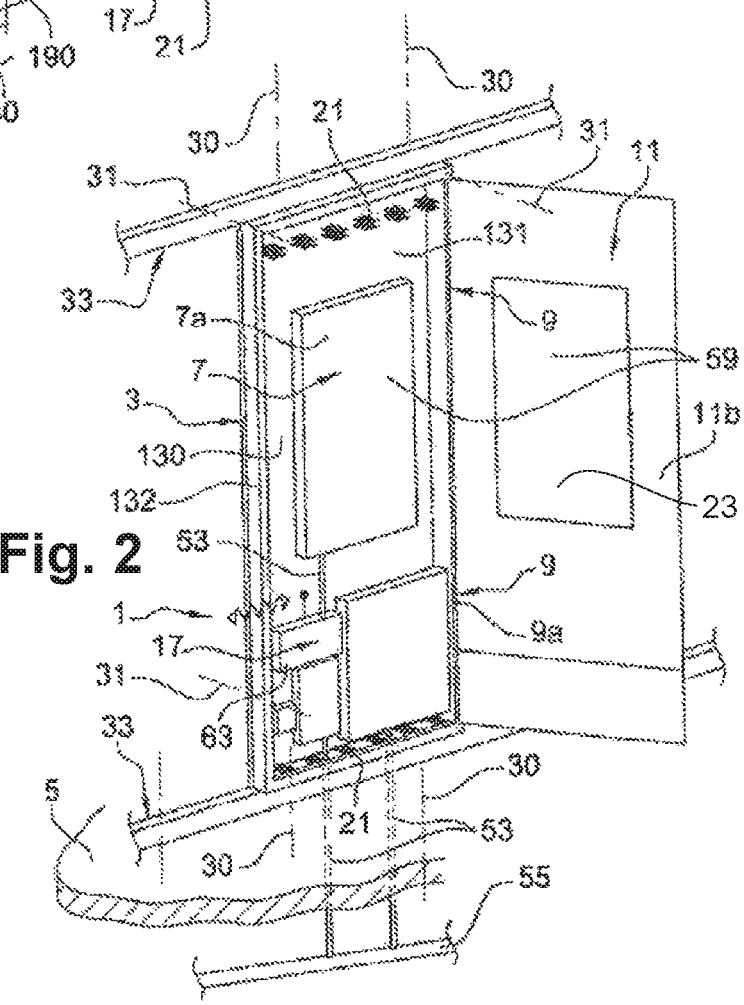
Figure 5:
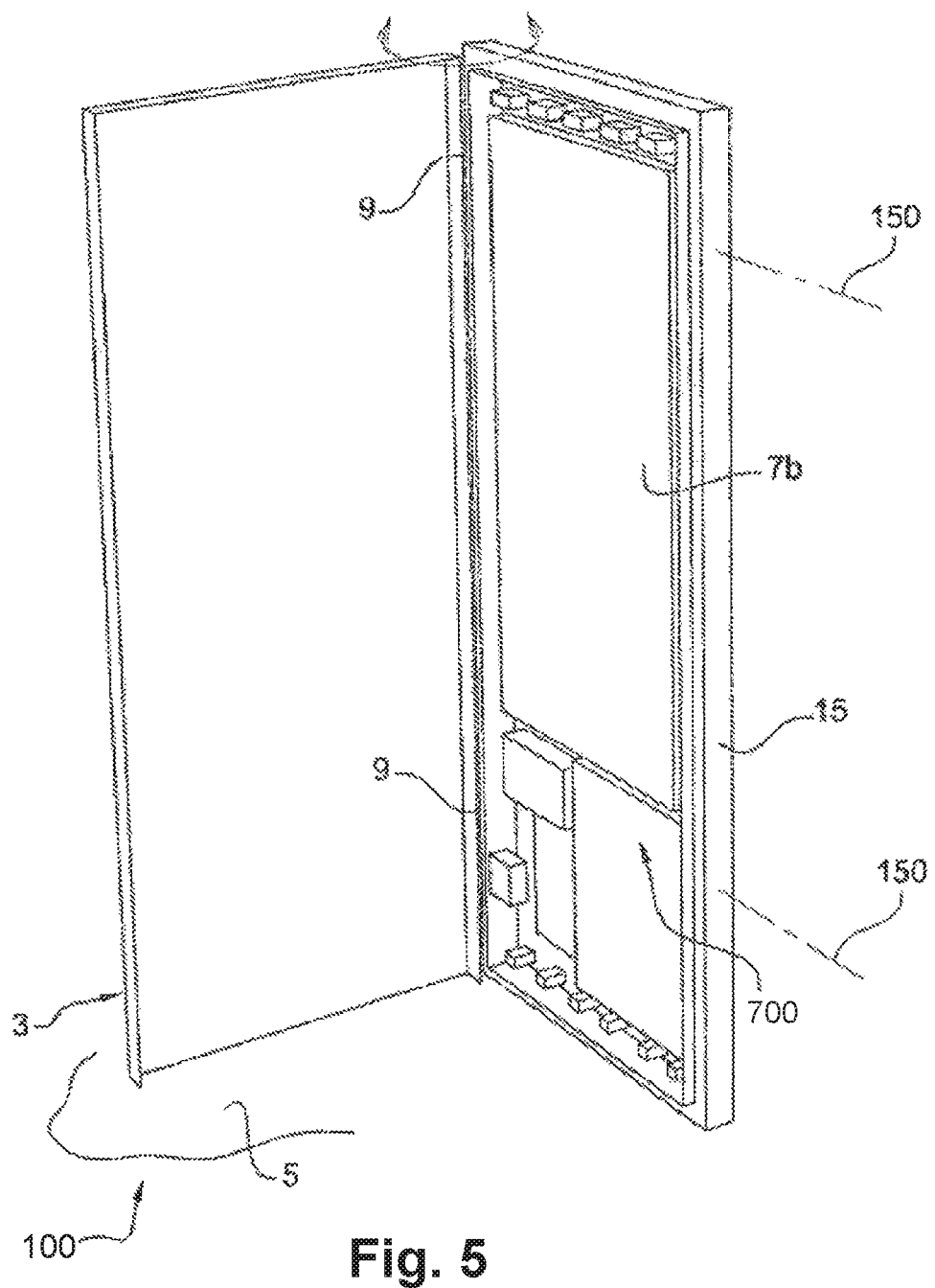
FIG. 5 shows the display structure from FIG. 4 in a three-quarters front view, when assembled and opened.

FIGS. 1-3 in particular show an information display structure 1 according to a solution proposed here.

They include:
- a stationary pan 3 to be secured upright on or against a support, a priori a floor 5,
- means 30 for securing the stationary part, and
- at least one information display screen 7,700 connected to the stationary part and extending in front of it, said screen having a visible front display face 7a.

Mobility means 9 are disposed between the stationary part and the display screen 7,700 or a facade 11 provided in front of the display screen 7,700.

This will permit a movement of the display screen 7,700 and/or of the facade 11 with respect to the stationary part between:
- a closed position of the display screen or of the facade, with same positioned in front of or against said stationary part 3, this closed position being the operational position in which the front display face is visible from in front of the structure (side labeled AVT, as in FIG. 3),
- and an opened position of the display screen or of the facade permitting access for maintenance:
  - behind the facade or the display screen,
  - or to a rear face, respectively 11b and 7b, of the facade or of the screen.

Mobility rotation has been envisioned in particular, as is illustrated. A relative mobility by translation from front to rear and inversely, on telescopic rails perpendicular to the screen, is also possible for example.

It must be understood that "stationary part" is a part that can occupy a stationary position along the platform, unlike the display screen 7,700 and/or the facade 11 which are kinds of doors or movable covers. It should be noted, however, that all or part of the "stationary part" can itself be movable (for example in relation to the stationary structural framework 33, for example via hinges and a disengageable lock (for example engaged on the stationary structural framework 33 which in sonic circumstances would make it possible to open the stationary part 3 and the display screen 7,700 and/or the facade 11 together.

As is shown FIGS. 1 and 2, it is recommended that the stationary part 3 includes:
- a fixed framework 13 to be secured on the support (or to an intermediate supporting structural framework), for example by at least some of the securing means 30, and
- a solid or substantially solid block 130 fixed to the stationary framework by second securing means 31 and closing the rear (AR) of the screen or of the display structure in said closed position (FIG. 3).

It will also be seen that it may appear useful that the solid block and the stationary framework include respectively a solid or substantially solid panel 131 and a frame 132 which at least partially surrounds it, the mobility means 9 preferably being disposed between the frame and the display screen or the facade.

To facilitate production, assembly and maintenance, it is recommended at a movable peripheral structure 15 is furthermore provided to which is fixed (by securing means 150) the display screen 7,700 and which preferably carries a part 9a of the mobility means (for example a male or female branch of hinges); cf. FIGS. 1 and 4.

The complementary part 9b of the mobility means will be fixed to the stationary framework 13, in particular the frame 132 (FIG. 2) or the (an inner edge of the) block 130 (FIG. 4).

As illustrated, it is recommended that the mobility means 9, 9a, 9b include hinges disposed vertically along the stationary part and along one of the lateral sides of the facade (FIG. 2) or of the mobile peripheral structure 15 (FIG. 4).

To operate the display screen like an LCD panel, the display structure 1, 100 includes electrical or electronic components such as those illustrated in FIG. 4.

For easier access and compactness, it is recommended that the electrical or electronic components 17 are at least in part, with the display screen 700, connected to said movable peripheral structure 15, so as to be movable with the latter, as is shown in FIG. 1 (securing arrangements 150). These components 17 will then be able in particular to be fixed intermediately to a plate 19 mounted behind the screen 700 and itself fixed to the peripheral structure 15 (securing arrangements 190).

In this case, it is recommended that ventilation means 21 are mounted with the mobile part (peripheral structure 15 and/or frame 132) and are fixed to the frame.

Alternatively, if only the facade is movable (FIG. 2), it is recommended that:
- the aforementioned components 17 remain, at least in part, stationary, mounted against/with the front face of the block 130,
- and that the same applies to the screen 7,
- and preferably to the ventilation means 21.

FIG. 2 moreover shows that the components 17 for operating the display screen 7 are fixed to the stationary part 3 and this screen has a tactile facade. In front of it there is only a single facade pane 11, movable with respect to the stationary part, preferably without another pane in front of the screen. The opening of the pane 11 gives access to the components and to the front face of the screen, as is shown in FIG. 2.

The ventilation means 21 cool the components 17 and blow air between the screen and the facade pane 11.

As ventilation means 21, two lines of ventilators are recommended, respectively at the top and bottom of the display structure, in order to ventilate the screen and components situated between them with the structure closed and operational.

Generally, for simple maintenance and protection of the screens, it is recommended that the information display structures 1,100 include a front pane 23 situated in front of the display screens 7,700 or the facade 11 and connected to one or the other, the front pane being mounted so as to be movable with the display screen or the facade.

In any event, it will be preferable that a single (transparent) pane protects the screen as a facade, whether its own pane (FIGS. 1 and 3) or an attached pane movable without it (FIG. 2). Likewise preferably, it will be possible to choose an arrangement in which, in front of each display screen and at a distance therefrom, along the barrier, the latter includes a single pane in the direction of its thickness, as in the figures. This will facilitate maintenance and may for example avoid ventilation between the two panes, two such panes were to exist in front of one of the screens 7,700 (that of the screen+one of the panes 111 erected in front).

Figure 6:
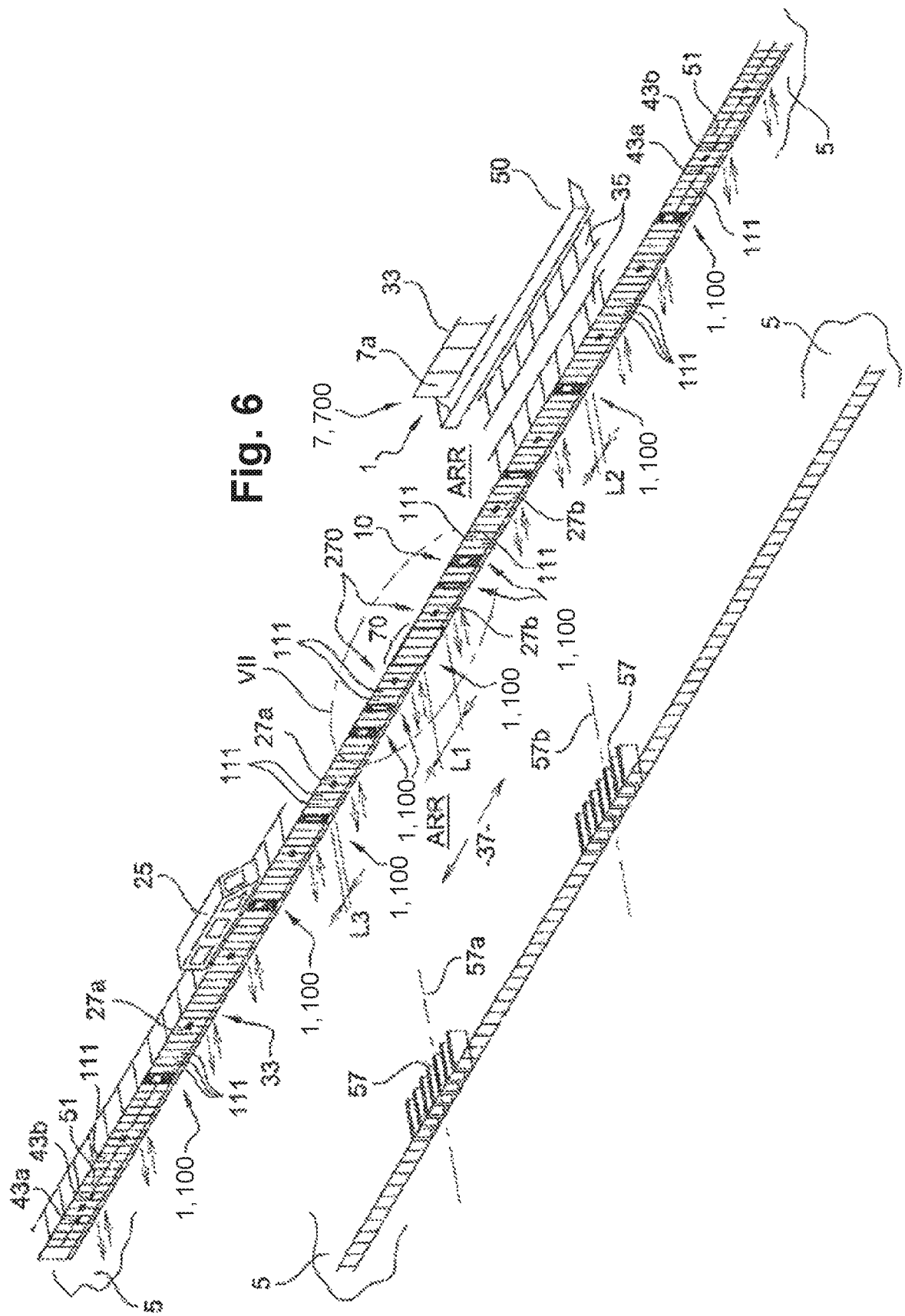
FIG. 6 shows a station, for example a metro station, of which the platform is provided with a barrier equipped with display structures of FIGS. 1-5.

FIGS. 6 et seq. show an elongate barrier 10 equipped with several information display structures 1,100 with only part of the barrier sometimes being illustrated.

The barrier 10 is erected on the support 5 which receives it and which is horizontal.

In practice, this will typically he a station platform which passed by a transport vehicle 25. However, it is also possible to imagine a separation between public area and a restricted access area, for example in an airport.

The barrier 10 stands between an accessible front side (AVT) and an inaccessible rear side (ARR).

It includes along its length:

- at least one movable door leaf 27a (or 27a, 27b) for opening and closing a passage 29, at this location, between the accessible front side and inaccessible rear side, respectively,
- at least one stationary block 31 (or 31a, 31b) adjacent to the leaf, the information display structures 1,100 which are situated at a distance from the or each leaf and of which the front display face is preferably visible on the accessible front side,
- a (stationary) structural framework 33 to which belongs the or each stationary block 3 and which can be fixed to each stationary part by the means 30 for securing the stationary part,
- and means 31 for securing the structural framework, these means 31 being fixed in the support 5.

The information display structures 1,100 are situated at a distance from the or each leaf 27a, 27b. Their front display face is visible on the accessible front side AVT.

As a variant, provision could be made that the front display face is visible on the inaccessible rear side ARR (tracks 35 in FIG. 6), but from the other side of these tracks (platform 50 in Figure. 6). Thus, from the other platform 50, the information on the screen would be visible from the platform 5 through the transparent panes 111 mounted (a priori fixedly) on the stationary structural framework 33 between the zones of the barrier that are provided with display structures 1,100.

The (or each) movable door leaf 27a (or 27a, 27b) is connected mechanically to the stationary block 31a (or 31a, 31b), parallel to which and therefore along which it slides, in the direction of sliding 37.

In the case of a stationary block called a functional block, the latter, or at least one of the two 31a, 31b, will enclose a space 39 in which is disposed at least one of the following components 41: a motor for motorizing the one or more movable door leaves, a drive device for the one or more leaves, which is disposed functionally between the motor and the leaf, a device for locking or unlocking the leaf (or leaves) in the opened or closed position and an end-of-travel abutment for the sliding of the movable door leaf. This situation is that of the example in FIGS. 8 and 9 which show, respectively, the side AVT (platform side or accessible side) and the side ARR (track side 35 or inaccessible side).

Figure 10:
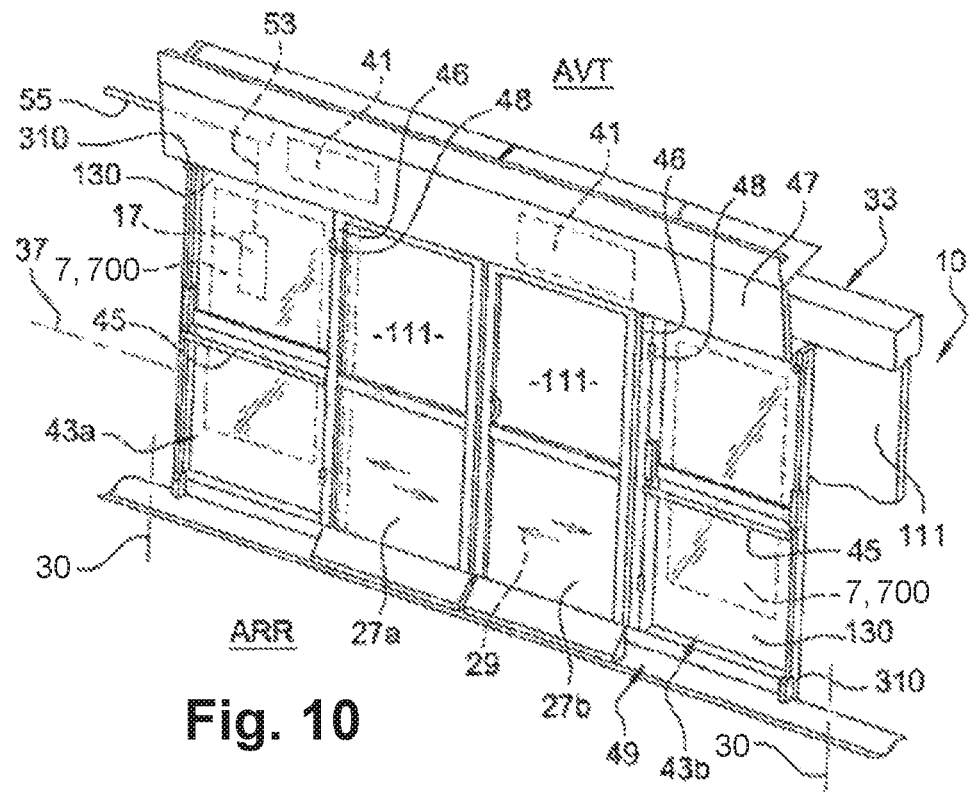
FIG. 10 shows from behind, when closed, a second embodiment of an entrance door that may belong to a platform barrier imagined here.

Alternatively, provision is made that the (or each) movable door leaf 27a (or 27a, 27b), thus provided for a normal access or exit via the passage 29, is bordered laterally by one or two safety doors 43a, 43b that extend along the barrier, parallel to the latter, as is shown schematically in FIG. 10.

Each lateral safety door is equipped with a known safety system with anti-panic bar 45 that it suffices to push so that the door opens (here by pivoting) from the inaccessible side (ARR) to the accessible side.

The or each safety door is mounted so as to be movable on a stationary surround 46, for example by hinges 48 having a common vertical axis; FIG. 10.

In addition, one or each safety door 43a and/or 43b is equipped with an information display structure 1,100, or at least one screen 7,700 of which the visible face 7a is directed toward the front AVT (the platform). FIG. 10 shows, on the side ARR, the solid or substantially solid block 130 fixed to the stationary framework.

FIG. 11 again shows a number of elements from FIG. 2, although this is a solution in which the stationary part 3 remains stationary as long as one has not opened the releasable securing means 310 established between the structural framework 33 and this stationary part 3, which will then be a door, since it is connected to the structural framework by pivoting means 451 on a vertical axis 451a.

Preferably, these pivoting means 451 and the axis 451a are situated on a vertical lateral edge of the frame 132, a priori on the side where the facade 11 pivots (on a parallel axis) if it is provided. Locking means 453 are provided on the stationary part 3 for selectively locking and unlocking the releasable securing means. A latch or a lock with their linkages will be suitable. If the facade 11 is provided, releasable locking means 455 separate from the means 453 (and for example lockable on the frame 132, but not on the framework 33) will permit access to the panel 7/7a without possible access to the other side (rear), excepting specific opening of the means 453.

Figure 11:
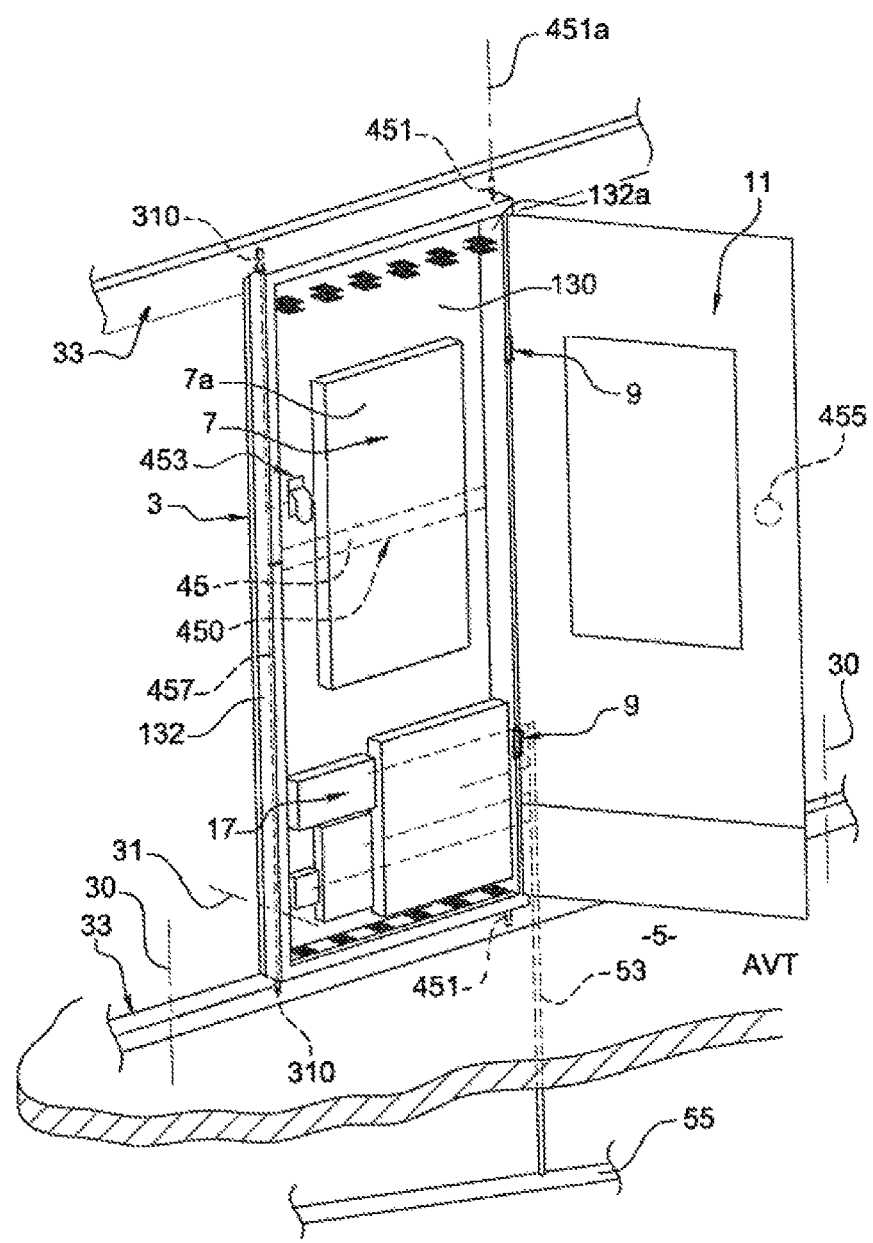
FIG. 11 shows a view of what can be the front side of a safety door from F1G. 10 and an alternative to the solution of FIG. 2.

Comparing FIGS. 10 and 11, it will be understood that each door 43a, 43b will be able to correspond to the solution of FIG. 11: The stationary part 3 (occasionally door) will then be provided with the safety system 450 with anti-panic bar 45 (inaccessible side, for example to the rear of the block 130 fixed to the frame 132). This anti-panic bar system will be connected functionally to the releasable securing means 310 (which will expediently be of the magnetic lock type), such that this stationary part 3 "occasional door"(or 43a, 43b in FIG. 10) can open even in the locked position of the locking means 453, when a push is exerted on the anti-panic bar 45. The push on the bar 45 will bring about the actuation of the linkage 457 (or of a relay) without the locking of the means 453 prohibiting it, thereby freeing the securing means 310. The occasional door 3 will then open, specifically exclusively to the front (platform or AVT), the pivoting means 451 being disposed accordingly.

FIG. 11 also shows that, in order to permit the pivoting of the stationary part 3, the electricity supply cables 53 will expediently be passed through the corresponding vertical post 132a of the frame in order to power the components 17. The means 30 fix the structural framework 33 to the support (such as the ground) 5 at a distance from the stationary part 3.

In another aspect, FIG. 10 shows (as also in FIGS. 8 and 9) that the movable door leaves 27a, 27b are glazed (transparent pane 111), as could be the panel laterally adjacent to the (each) safety door 43a and/or 43b (this can be the block 130 of FIG. 11).

In this case, the components 41 operating the one or more leaves 27a, 27b (for opening them, closing them, locking them and unlocking them) will be housed, at least substantially, in an upper caisson 47 which tops the door module 49, this module including the movable leaves and the lateral safety door. The caisson extends longitudinally along the direction 37, thus also above the leaves, both in the opened position and also the closed position of these.

Figure 7:
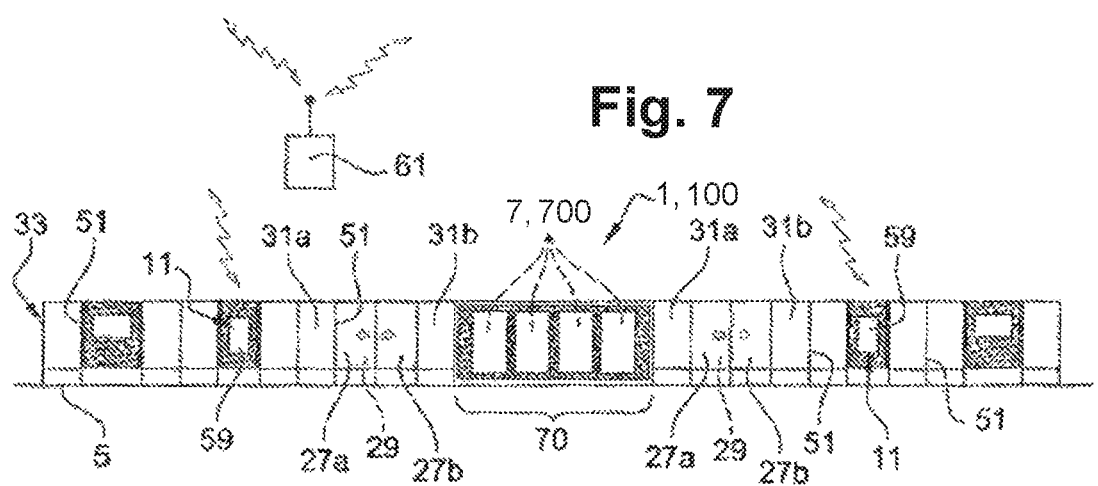
FIG. 7 shows the detail VII from FIG. 6.
Figure 8:
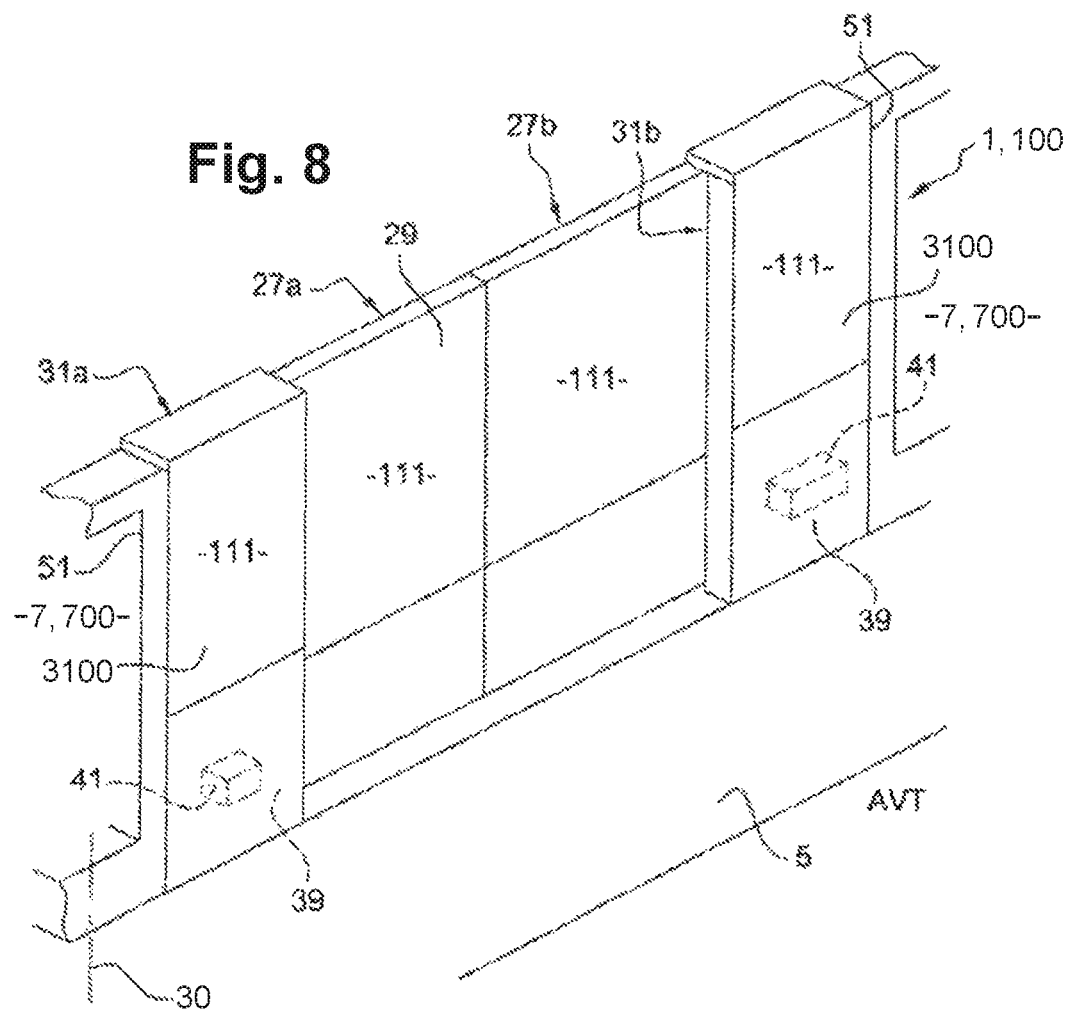
FIG. 8 and 9 show, respectively from in front and from behind when closed, a first embodiment of an entrance door that may belong to a platform barrier imagined here.
Figure 9:
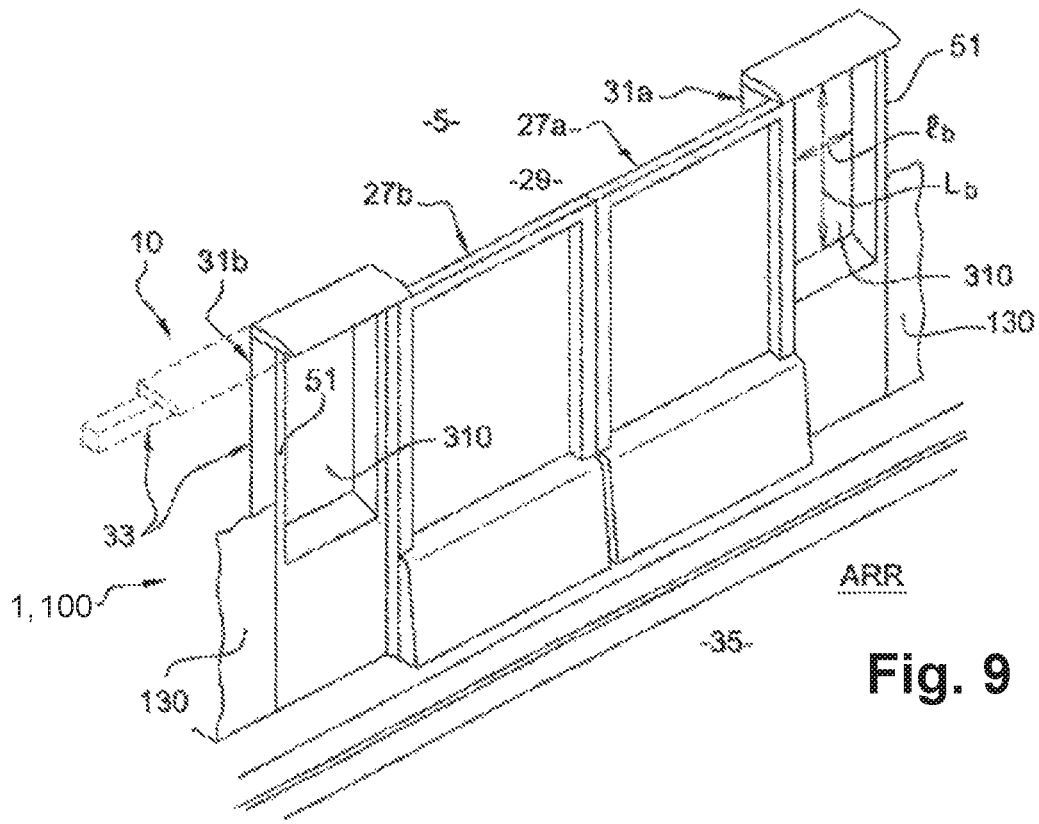

As is shown in FIGS. 7-9 (in which the structure 1 or 100 is just symbolized), provision is moreover made that, along the length of the barrier 10, the structural framework 33 includes upright lateral posts 51, between two of which is disposed at least one display structure 100, a display screen 700 (solution of FIG. 1 for example), or this display screen and the facade 11 (solution of FIG. 2). The posts 51 will preferably be hollow girders or poles with a closed (rectangular) or U-shaped cross section.

It is clear that such lateral posts 51 can be provided in the case of a barrier with safety door(s) 43a, 43b, as is envisioned in FIG. 6.

As has already been mentioned, it is further recommended, for maintenance and safety, that the information display facades along the barrier comprise, in front of each display screen 7,700, at least one glazed panel through which the information is seen.

Moreover, for supplying electricity to the screens 7,700 and/or some at least of the electrical or electronic components 17, provision is made, at least in the case of a barrier 10 without upper caisson 47, that this barrier includes, along its length, electricity supply cables 53 which are connected to said display screens and/or to at least one of said components. The cables 53 pass through the support 5, at a distance from each leaf 27a, 27b, and stationary block if it exists (cf. FIG. 8 and 9).

As is shown in FIG. 2, the electricity supply cables 53 are connected to a main electricity supply (cable) which, in particular if the barrier has no upper longitudinal caisson 47, will pass under the support 5, here a platform under which a volume is reserved for the passage in particular of electricity cables.

It is thus possible to avoid congesting the area of the passages 29.

The barriers without an upper longitudinal caisson 47 will typically be barriers referred to as "half-height" barriers, in which, with the one or more leaves opened, the space above these is free (case of FIGS. 8 and 9).

If the barrier is provided with an upper longitudinal caisson 47 in one or more aligned sections (case of the barriers referred to as "full-height" barriers), the main electricity supply cable 55 will then pass through the caisson 47 where the electricity supply cables 53 of the electrical or electronic components 17 will be joined (even of the components 41 for operating the leaves), as is shown schematically in FIG. 10.

To promote especially the movement of persons, in particular in the accessible zone 5, or even between the accessible zone and inaccessible zone, and if, as shown schematically in FIG. 6, the barrier 10 occupies the entire length of a station platform 5 through which a transport vehicle 25 passes, it is further recommended that this barrier includes:
two first sets of first and second stationary blocks 31a, 31b extending along the barrier, and
two second sets of first and second movable door eaves 27a, 27b,
with the display screens 7,700 distributed:
on the one hand, in screen groups 70 (FIG. 6) disposed side by side, toward the central part of the length of the platform, between the two second sets of first and second movable door leaves (designated 270 in FIG. 6),
on the other hand, disposed individually, more laterally along the platform; see also FIG. 6.

For the same purpose, it is recommended that the group of screens disposed side by side toward the central part of the length of the platform has, along the length of the barrier, a length L1 greater than the length L2 or L3 of each second set; cf. FIG. 6 in which L2 and L3 rather show a width dimension, although this makes no change to the proportions indicated above.

Another point treated concerns the preferred arrangement of the information display zones on screens. In this context, it is recommended that the or each stationary block 31a (or 31a, 31b) has, along the barrier, a free surface 3100 which is adjacent to said space 39 provided for housing the components 41, and which could be glazed and transparent (as in FIG. 8 and 9: panes 111), the display screens 7,700 then being sited at a distance from the one or more stationary blocks, with in this case, for at least some of them, a front display face larger than that of the free surface.

In an embodiment as in FIGS. 8 and 9, however, provision can be made that a structure 1,100 with a screen 7,700, as in one of the solutions of FIGS. 1-5, is fixed next to the stationary block 31a, 31b, in a manner thus adjacent to it, and the supply of the electrical or electronic components 17 can then be made via the space 39.

Such an installation of the screen structures 7,700, all at least potentially of a size greater than Lb.times.lb, will improve the visibility on the screens, will distance the persons situated in front of the screens away from the leaves and from their immediate proximity, will limit the weight of the leaves and will avoid complicating their operational safety.

As regards a station itself now, such as the one in FIG. 6, may typically be defined as a zone:
through which a transport vehicle 25 passes,
having a platform 5, and
providing accesses 57 to the platform for passengers wishing access the vehicle in the station, each access extending (or opening onto the platform 5) along an axis (such as 57a and 57b for the two accesses schematically depicted), the station comprising, along the platform, several information display strictures 1,100.

The display screens are distributed as above, namely:
on the one hand, in screen groups disposed side by side, toward the central part of the length of the platform, between two groups of movable leaves and stationary blocks,
on the other hand, disposed individually, more laterally along the platform.

An important point is that the one or more screen groups disposed side by side are laterally offset with respect to the axis of each access 57.

This will distance the persons situated in front of the screens away from the axis of each access, which is favorable as regards safety and as regards access for maintenance, Another aspect of the station concerns the fact that the display screens will preferably be distributed:
on the one hand, in screen groups 70 disposed side by side, toward the central part of the length of the platform, between two groups of movable leaves and stationary blocks or safety doors (43a, 43b),
on the other hand, disposed individually, more laterally along the platform than the first ones (such as those of width L2 or L3).

As will be understood from FIGS. 2, 6 and 7, at least some of the display structures of these second display screens will preferably be provided with interactive operating means 59 connected to remotely situated processing means 61 to permit man-machine interaction allowing a user situated in front of one of these second screens, such as those under the broken lines in FIG. 7, to transmit a request (via transmitting/receiving means) to the processing means, via the interactive operating means 59, 63, and to obtain a return of information on these second display screens.

Preferably, the processing means 61 and the local interactive operating means 59, 63 (situated on the platform) will exchange, via transmitting/receiving means and/or local processing means, information permitting wireless communication.

It will further be noted that other inventive aspects are considered likely to respond as an invention to identified technical problems.

It concerns the following:

an elongate barrier erected on a support which is horizontal, such as a station platform where a transport vehicle passes, the barrier standing between an accessible front side and an inaccessible rear side and including along its length:
- at least one movable door leaf in order to open and close a passage, at this location, between the accessible front and inaccessible rear sides,
- at least one stationary block to which the movable door leaf is connected mechanically and in parallel with which said leaf slides, the stationary block, which is adjacent to the leaf, enclosing a space in which is disposed at least one of the following components: a motor for motorizing the movable door leaf, a leaf drive device positioned functionally between the motor and the leaf, a device for locking or unlocking the leaf in an opened or closed position, and an end-of-travel abutment for the sliding of the movable door leaf,
- several information display structures, which are situated at a distance from the or each leaf and which each comprise at least one information display screen having a front display face preferably visible on the accessible front side,
- a stationary structural framework to which the display screens are fixed directly or indirectly, and
- preferably means for securing the structural framework, which are secured in the support.

With a multimedia barrier of this kind, it will be possible to improve the information for users, without forcing them to move away from the edge of the platform (where the barriers of the "entrance door" type shown here are normally situated), and without risking a situation where people looking at the screens gather opposite the door leaves.

It is recommended that, as has already been mentioned, electricity supply cables, along the barrier erected on the support, are connected to the display screens and/or to at least one of the components for operating these screens, the cables passing through the support at a distance from each leaf and stationary block.

The electrical connections will thus be facilitated, by making the installation easier without the need for a centralized connection on the barrier.

It will furthermore be recommended that. as has likewise already been mentioned:
- the or each stationary block has, along the barrier, a free surface which is adjacent to the space for housing the operating of the screens and which could be glazed and transparent, and
- the front display face of at least some of the information display screens is larger than the free surface, such that the display screens are sited at a distance from the one or more stationary blocks.

Thus, and as has already been mentioned:
- the display zones on screens will not interfere with the zones of transit of persons passing by the door leaves,
- and, on the platform or for example the hall where the barrier is erected, the persons present will be able to have easy and safe access to the displayed information, without losing sight of their environment: arrival of a train at the station or of a person in the arrivals hall of the airport, etc.

Stations set out as has been mentioned above, but with this type of barrier, would be suitable and are here considered as in particular responding to the same problems, or affording the same advantages, as those mentioned above.

The invention claimed is:

1. An elongate barrier erected on a horizontal support and standing between an accessible front side and an inaccessible rear side and comprising along a length of the elongate barrier,
- at least one movable door leaf configured to open and close a passage between the accessible front side and the inaccessible rear side;
- at least one safety door equipped with an anti-panic bar system and mounted so as to be movable on a frame structure, the at least one safety door laterally bordering the at least one movable door leaf which slides parallel thereto,
- a plurality of electronic information display structures, which are situated at a distance from the at least one movable door leaf and of which a front display face is visible on the accessible front side,
- each of the plurality of electronic information display structures comprising:
  - a stationary part to be secured upright on or against the horizontal support;
  - fasteners for securing the stationary part;
  - at least one information display screen connected to the stationary part and extending in front of the stationary part, the at least one information display screen including the front display face;
  - at least one hinge disposed between the stationary part and either 1) the at least one information display screen, or 2) a facade provided in front of the at least one information display screen, wherein:
    - in the case that the at least one hinge is disposed between the stationary part and the at least one of the plurality of information display screens, the at least one hinge permits a movement of the at least one of the plurality of information display screens with respect to the stationary part between (i) a closed position of the at least one of the plurality of information display screens, the at least one of the plurality of information display screens being positioned in front of or against the stationary part, the closed position being an operational position in which the at least one of the plurality of information display screens of the front display face is visible from in front of the electronic display structure, and (ii) an open position of the at least one of the plurality of information display screens, allowing access for maintenance behind the at least one of the plurality of information display screens or, a rear face of the at least one of the plurality of information display screens; and
    - in the case that the at least one hinge is disposed between the stationary part and the façade, the at least one hinge permits a movement of the facade with respect to the stationary part between (i) a closed position of the facade, the facade being positioned in front of or against the stationary part, the closed position being an operational position in which the at least one of the plurality of information display screens of the front display face is visible from in front of the electronic display structure, and (ii) an open position of the facade, allowing access for maintenance behind the facade or, a rear face of the facade;

a stationary structural framework fixed to each stationary part by the fasteners for securing the stationary part, and wherein the at least one of the safety door is equipped with at least one of the plurality of electronic information display structures provided with the at least one information display screen.

2. The barrier of claim 1 in which the stationary part comprises:

a solid or substantially solid block fixed to the stationary framework by second fasteners and the solid or substantially solid block is arranged to close the rear of the at least one of the plurality of information display screens or of the display structure.

3. The barrier of claim 2 in which the solid or substantially solid block and the stationary framework together comprise a solid or substantially solid panel and a frame which at least partially surrounds the panel, with the at least one hinge being disposed between the frame and either the at least one of the plurality of information display screens or, in the case where the at least one hinge is disposed between the stationary part and the façade, the facade.

4. The barrier of claim 1 further comprising a movable peripheral structure to which is fixed the at least one of the plurality of information display screens and which carries the at least one hinge.

5. The barrier of claim 4 wherein the at least one hinge is disposed vertically, along the stationary part and one lateral side of either the movable peripheral structure or, in the case where the at least one hinge is disposed between the stationary part and the façade, the facade.

6. The barrier of claim 1 further comprising a front pane situated in front of and connected to either the at least one of the plurality of information display screens or, in the case where the at least one hinge is disposed between the stationary part and the façade, the facade, the front pane being mounted so as to be movable with either the at least one of the plurality of information display screens or, in the case where the at least one hinge is disposed between the stationary part and the façade, the facade.

7. The barrier of claim 1 further comprising at least one stationary block to which the at least one movable door leaf is connected wherein the at least one movable door leaf slides parallel to the at least one stationary block and wherein the stationary block, which is adjacent to the at least one movable door leaf, encloses a space in which is disposed at least one of the following components: a motor for motorizing the at least one movable door leaf, a leaf drive device positioned functionally between the motor and the at least one movable door leaf, and an end-of-travel abutment for sliding of the at least one movable door leaf.

8. The barrier of claim 1, in which, the structural framework comprises, along its length, upright lateral posts, between two of which is disposed at least one of 1) the display structure, the at least one of the plurality of information display screens, or 2), in the case where the at least one hinge is disposed between the stationary part and the façade, the at least one of the plurality of information display screens and the facade.

9. The barrier as claimed in claim 1, wherein in the case the at least one hinge is disposed between the stationary part and the façade, the facade comprises, in front of the at least one of the plurality of information display screens, at least one glazed panel through which information is visible.

10. The barrier as claimed in claim 7, which comprises, along the barrier erected on the support, electricity supply cables connected to the at least one of the plurality of information display screens and/or to at least one electrical or electronic components, the cables passing through the support, at a distance from each leaf and stationary block or safety door, or through a hollow post of the frame structure where a shaft for pivoting the safety door passes.

11. The barrier of claim 1, in which, in front of and at a distance from each information display screen, the at least one of the plurality of electronic information display structures comprises, along the barrier, a single pane in a direction of thickness of the electronic information display structure.

12. The barrier of claim 7, in which:

the at least one stationary block has, along the barrier, a free surface which is adjacent to a space for housing electrical or electronic components, and the front display face of the at least one of the plurality of information display screens is larger than the free surface, such that the at least one of the plurality of information display screens is sited at a distance from the one or more stationary blocks.

13. The barrier of claim 1, wherein the fasteners are releasable for securing between the structural framework and the stationary part, wherein the fasteners comprise:

at least one second hinge disposed between the stationary part and the structural framework for pivoting the stationary part on the structural framework, and a lock for selectively locking and unlocking the fasteners.

14. The barrier of claim 13, in which the anti-panic bar system is functionally connected to the fasteners, the stationary part being defined by the safety door, such that the safety door can open even in a locked position of the lock when a push is exerted on the anti-panic bar system, wherein at least one of the information display structures is fixed to at least one of the at least one safety door.

15. A station through which a transport vehicle passes, the station comprising:

a platform and providing accesses to the platform for passengers wishing to access the vehicle in the station, each of the accesses extending along an axis along the platform, a barrier erected on a horizontal support and standing between an accessible front side and an inaccessible rear side and comprising along a length of the barrier, at least one movable door leaf configured to open and close a passage between the accessible front side and the inaccessible rear side;

at least one safety door equipped with an anti-panic bar system and mounted so as to be movable on a frame structure, the at least one safety door laterally bordering the at least one movable door leaf which slides parallel thereto, a plurality of electronic information display structures, which are situated at a distance from the at least one movable door leaf and of which a front display face is visible on the accessible front side, a plurality of information display screens;

each of the plurality of electronic information display structure comprising:

a stationary part to be secured upright on or against the horizontal support;

fasteners for securing the stationary part;

at least one of the plurality of information display screens connected to the stationary part and extending in front of the stationary part, the at least one of the plurality of information display screens including the front display face;

at least one hinge disposed between the stationary part and either 1) the at least one of the plurality of information display screens, or 2) a facade provided in front of the at least one of the plurality of information display screens, wherein:

in the case that the at least one hinge is disposed between the stationary part and the at least one of the plurality of information display screens, the at least one hinge permits a movement of the at least one of the plurality of information display screens with respect to the stationary part between (i) a closed position of the at least one of the plurality of information display screens, the at least one of the plurality of information display screens being positioned in front of or against the stationary part, the closed position being an operational position in which the at least one of the plurality of information display screens with the front display face is visible from in front of the electronic display structure, and (ii) an open position of the at least one of the plurality of information display screens, allowing access for maintenance behind the at least one of the plurality of information display screens or, a rear face of the at least one of the plurality of information display screens; and in the case that the at least one hinge is disposed between the stationary part and the façade, the at least one hinge permits a movement of the facade with respect to the stationary part between (i) a closed position of the facade, the facade being positioned in front of or against the stationary part, the closed position being an operational position in which the at least one of the plurality of information display screens with the front display face is visible from in front of the electronic display structure, and (ii) an open position of the facade, allowing access for maintenance behind the facade or, a rear face of the facade;

a stationary structural framework fixed to each stationary part by the fasteners for securing the stationary part, and wherein the at least one safety door is equipped with at least one of the plurality of electronic information display structures provided with the at least one of the plurality of information display screens;

wherein:

a first part of the plurality of information display screens is distributed in screens groups disposed side by side with respect to each other, toward a central part of a length of the platform, between two groups of movable door leaves and stationary blocks, the screen groups being offset laterally with respect to an axis of each access, and a second part of the plurality of information display screens is disposed individually, laterally along the platform.

16. A station through which a transport vehicle passes, the station comprising:

a platform and providing accesses to the platform for passengers wishing to access the vehicle in the station, each of the accesses extending along an axis;

along the platform, a barrier erected on a horizontal support and standing between an accessible front side and an inaccessible rear side and comprising along a length of the barrier, at least one movable door leaf configured to open and close a passage between the accessible front side and the inaccessible rear side;

at least one safety door equipped with an anti-panic bar system and mounted so as to be movable on a frame structure, the at least one safety door laterally bordering the at least one movable door leaf which slides parallel thereto, a plurality of electronic information display structures, which are situated at a distance from the at least one movable door leaf and of which a front display face is visible on the accessible front side, a plurality of information display screens;

each of the plurality of electronic information display structures comprising:

a stationary part to be secured upright on or against the horizontal support;

fasteners for securing the stationary part;

at least one of the plurality of information display screens connected to the stationary part and extending in front of the stationary part, the at least one of the plurality of information display screens including the front display face;

at least one hinge disposed between the stationary part and either 1) the at least one of the plurality of information display screens, or 2) a facade provided in front of the at least one of the plurality of information display screens, wherein:

in the case that the at least one hinge is disposed between the stationary part and the at least one of the plurality of information display screens, the at least one hinge permits a movement of the at least one of the plurality of information display screens with respect to the stationary part between (i) a closed position of the at least one of the plurality of information display screens, the at least one of the plurality of information display screens being positioned in front of or against the stationary part, the closed position being an operational position in which the at least one of the plurality of information display screens with the front display face is visible from in front of the electronic display structure, and (ii) an open position of the at least one of the plurality of information display screens, allowing access for maintenance behind the at least one of the plurality of information display screens or, a rear face of the at least one of the plurality of information display screens; and in the case that the at least one hinge is disposed between the stationary part and the façade, the at least one hinge permits a movement of the facade with respect to the stationary part between (i) a closed position of the facade, the facade being positioned in front of or against the stationary part, the closed position being an operational position in which the at least one of the plurality of information display screens with the front display face is visible from in front of the electronic display structure, and (ii) an open position of the facade, allowing access for maintenance behind the facade or, a rear face of the facade;

a stationary structural framework fixed to each stationary part by the fasteners for securing the stationary part, and wherein the at least one safety door is equipped with at least one of the plurality of electronic information display structures provided with the at least one of the plurality of information display screens;

wherein:
- a first part of the plurality of information display screens is distributed in screen groups disposed side by side with respect to each other, toward a central part of a length of the platform, between two groups of movable leaves, and
- a second part of the plurality of information display screens is disposed individually, laterally along the platform, at least a portion of the second part is configured to transmit a request to a remote processor and to obtain a return of information on the second part of the plurality of information display screens.

\* \* \* \* \*

UNITED STATES PATENT AND TRADEMARK OFFICE
CERTIFICATE OF CORRECTION

PATENT NO.      : 10,597,045 B2
APPLICATION NO. : 14/443530
DATED           : March 24, 2020
INVENTOR(S)     : Gilles Lardy Page 1 of 1

It is certified that error appears in the above-identified patent and that said Letters Patent is hereby corrected as shown below:

In the Claims

Column 15, Claim 15, Line 53, delete second instance of "screens" and insert in its place --screen--.

Signed and Sealed this
Thirteenth Day of October, 2020

Andrei Iancu
*Director of the United States Patent and Trademark Office*